(12) United States Patent
Southern, Jr.

(10) Patent No.: US 10,549,959 B1
(45) Date of Patent: Feb. 4, 2020

(54) WARNING ASSEMBLY FOR USE WITH LOAD TRANSPORTING EQUIPMENT

(71) Applicant: Raymond C. Southern, Jr., Pembroke Pines, FL (US)

(72) Inventor: Raymond C. Southern, Jr., Pembroke Pines, FL (US)

( * ) Notice: Subject to any disclaimer, the term of this patent is extended or adjusted under 35 U.S.C. 154(b) by 0 days.

(21) Appl. No.: 15/964,724

(22) Filed: Apr. 27, 2018

(51) Int. Cl.
*B66C 15/06* (2006.01)
*B66C 23/90* (2006.01)
*B60P 1/54* (2006.01)

(52) U.S. Cl.
CPC .............. *B66C 15/065* (2013.01); *B60P 1/54* (2013.01); *B66C 23/90* (2013.01)

(58) Field of Classification Search
CPC ......... B66C 13/44; B66C 13/46; B66C 15/04; B66C 15/06; B66C 15/065; B66C 23/90; B60P 1/54
See application file for complete search history.

(56) References Cited

U.S. PATENT DOCUMENTS

| | | | |
|---|---|---|---|
| 3,969,714 A | 7/1976 | Greer | |
| 5,019,798 A * | 5/1991 | Pherigo, Jr. | ............. B66C 15/06 340/321 |
| 5,198,800 A | 3/1993 | Tozawa et al. | |
| 6,140,930 A | 10/2000 | Shaw | |
| 6,549,139 B2 | 4/2003 | Shaw, Jr. | |
| 6,894,621 B2 | 5/2005 | Shaw | |
| 8,950,605 B2 | 2/2015 | Jene | |
| 9,280,885 B2 | 3/2016 | Frederick | |
| 2003/0214415 A1* | 11/2003 | Shaw | ...................... B66C 13/44 340/685 |
| 2008/0238617 A1* | 10/2008 | Kuhl | .................. G06K 19/0723 340/10.1 |
| 2014/0361903 A1 | 12/2014 | Sawada | |

* cited by examiner

*Primary Examiner* — Omeed Alizada
(74) *Attorney, Agent, or Firm* — Malloy & Malloy, P.L.

(57) ABSTRACT

A warning assembly structured to be attached to load transporting equipment, said warning assembly comprising: a housing, a detection assembly, an indicator assembly, and an activation mechanism. An attachment structure is used to attach the housing to the load transporting equipment. The detection assembly is generally disposed on the housing and is configured to determine at least a vertical distance from an initial position. The indicator assembly is also disposed on the housing and comprises a sound indicator and/or a visual indicator. The activation mechanism is operatively connected to the indicator assembly and/or the detection assembly, and is generally configured to automatically activate and/or deactivate the sound indicator and/or visual indicator upon the occurrence of a predetermined condition. The activation mechanism may also be configured to manually control the sound indicator and/or the visual indicator.

19 Claims, 10 Drawing Sheets

WARNING ASSEMBLY FOR USE WITH LOAD TRANSPORTING EQUIPMENT

BACKGROUND OF THE INVENTION

Field of the Invention

The present invention relates to alarms and warning devices for use in connection with load transporting equipment.

Description of the Related Art

A significant safety concern is the risk of harm created by overhead loads that are being transported. Such risk of harm is predominant around construction project sites, ports, warehouses, and all other environments where loads need to be transported. Load transporting operations have traditionally required a crew of workers designated to issue warnings, and to ensure that there is a non-obstructed path of travel for the load. Such crews often times carry items that are used for warning purposes such as whistles and other hand-held articles for visual signalization. The aforementioned crews often times include a rigger, or similar designated worker, who is typically in charge of mounting a load onto the transporting equipment or machinery. Although a rigger may often use a whistle and/or a handheld article for signalization, it is virtually impossible for the rigger to physically follow the load through its path of travel from an initial to a final location. For example, it is practically impossible for a rigger to ensure a clear path for an overhead load across several stories on a high-rise construction project. It is also difficult for a rigger to effectively warn pedestrian and vehicular traffic of a dangerous condition such as an overhead load. Although additional crews may be designated to accomplish the onerous task of warning others of a dangerous condition(s), such additional crews inevitably increase the expense associated with the load transporting operation. Even then, the efficiency of such safety protocols, where crews manually provide a warning, is limited due to the associated human error. An individual may become distracted, weather conditions may prevent the individual from noticing a dangerous condition, etc. Moreover, an individual may not necessarily be able to follow a load at the same pace of the underlying transporting equipment. Given the foregoing limitations, such a manual approach remains an impractical alternative.

Accordingly, there is a need in the industry for a device that is capable of efficiently providing both a sound and a visual warning during load transporting operations. The industry would benefit if such a device could provide a sound and/or visual warning automatically, such as upon the occurrence of specific events associated with dangerous conditions. The industry would also benefit by providing a device that may be remotely controlled so that it that may be placed on the load itself, or on the load transporting equipment. A further advantage would be realized by providing a device with memory capabilities and sensory components structured to determine and interpret dangerous conditions and automatically trigger a warning.

SUMMARY OF THE INVENTION

The present invention is directed towards a warning assembly that may be used in connection with equipment and/or machinery capable of carrying or transporting a load. Such equipment and/or machinery may include, but is not necessarily limited to, mobile cranes, tower cranes, telescopic cranes, truck-mounted cranes, loader cranes, overhead cranes, boom trucks, hoists, and rigging equipment. Alternatively, the warning assembly according to the present invention may also be used in connection with other equipment and/or machinery for which a warning is also useful. This includes, but is not limited to, oversized vehicles, trucks, tractors, excavators, forklifts, and other related equipment and/or machinery. The present invention is also directed towards a corresponding method of using the inventive warning assembly on load transporting equipment. The warning assembly according to the present is intended to be activated so that it may visually and/or audibly warn an individual(s) of the existence of a risk of danger presented by a load that is being transported either substantially above and/or within relative proximity to the individual(s).

The warning assembly according to the present invention generally comprises a housing, a detection assembly, an indicator assembly, and an activation mechanism. The housing may have a variety of shapes and sizes, but should have a size suitable for an individual to use the warning assembly as a hand-held assembly. Accordingly, the housing may comprise a substantially elongated configuration that facilitates a grip. For example, the shape of the housing may be cylindrical. The housing may also comprise an attachment structure(s) to attach the housing to the underlying equipment and/or machine. For example, the attachment structure may comprise a clip, a band, a magnet, a loop, or other structure which may facilitate attachment of the housing to a component of the underlying equipment or machine such as, but not limited to, a lifting hook. Alternatively, the housing may be attached or connected to the load itself. As used herein, attaching the housing to the load transporting equipment comprises attaching the housing to the load transporting equipment and/or machinery, or to a container, bucket, pallet, band, strap, or other fastening mechanism, that secures and/or carries the load, or when feasible, to the load itself. It is within the scope of the present invention that the warning assembly be attached to the equipment transporting the load, to the load itself, or that it be disposed within sufficient proximity thereto, so that both the load and the housing travel substantially together.

The detection assembly is generally disposed on the housing, and is structured to determine at least a vertical distance of travel or otherwise displacement of the detection assembly, and consequently the load, relative to an initial position. For example, the detection assembly may comprise an altimeter. The initial position may be a location where a load is initially mounted to the underlying equipment or machinery, such as ground level, or a higher or lower level of a building or structure. The detection assembly may also be configured to determine a horizontal displacement of the detection assembly. Thus, the detection assembly may comprise global positioning system (GPS) capabilities. Such GPS capabilities may track the movement and/or location of the detection assembly.

Further features of the detection assembly include an acceleration measuring device, which may be structured to determine an acceleration of the detection assembly, and consequently the load. By way of example only, the detection assembly may comprise an accelerometer. The detection assembly may also comprise a counting device, which may be configured to track the number of times that the warning assembly is activated and/or deactivated. For example, the counting device may determine the total number of loads picked up, mounted, or otherwise disposed on the underlying equipment and/or machinery. The detection assembly, such as through the counting device, may also determine other data such as, but not limited to, the date and/or time that the indicator assembly was activated.

Additional features of the present invention comprise providing a warning assembly with proximity capabilities. A detection assembly comprising proximity capabilities may be operatively configured with a portable device(s) that an individual(s) may carry during a load transporting operation(s). The housing and the detection assembly may be disposed on the load transporting equipment, whereas an individual(s) may carry a portable device(s), which is a separate component that is not disposed on the housing. Thus, the indicator assembly may be automatically activated when the individual(s) carrying the portable device(s) is located within sufficient proximity to the detection assembly, and consequently the load. This feature may serve to warn the individual of a potentially dangerous condition created by the load. For example, an individual carrying a portable device may be located in an area where the detection assembly, and consequently the load, may be approaching. Thus, the indicator assembly may be automatically activated when the detection assembly, and consequently the load, travel and reach a location that is within sufficient proximity to the individual(s) carrying the portable device(s). Also as an example, the indicator assembly may be automatically activated if an individual(s) carrying a portable device(s) approaches a location that is within sufficient proximity to the detection assembly, and consequently the load. Other features of the detection assembly according to the present invention comprise a providing a lightning detector capable of activating the indicator assembly if a lightning event occurs within a predetermined distance of the detection assembly, and consequently the load.

The activation mechanism of the warning assembly according to the present invention is generally operatively connected to the indicator assembly. The activation mechanism may also be operatively connected to the detection assembly. The activation mechanism may manually activate the indicator assembly. Additionally, the activation may automatically activate the indicator assembly, such as upon the occurrence of a predetermined condition. More specifically, the activation mechanism may activate either or both of the visual indicator and the sound indicator upon the occurrence of the predetermined condition. The predetermined condition may comprise various events for which it would be appropriate to activate the indicator assembly. In load transporting applications, it may be desirable to activate the indicator assembly only after the load(s) has been mounted onto the underlying equipment and/or machinery, and/or only after the load has traveled a certain distance. For example, the predetermined condition may comprise a predetermined distance of travel of the detection assembly, and consequently the load. More specifically, the predetermined condition may comprise the load, and the detection disposed within relative proximity thereto, traveling, moving, or being transported a predetermined distance from an initial position. For example, the predetermined distance may be a distance of travel from an initial position of the detection assembly, and consequently the load, in the vertical direction. As a non-limiting example, the predetermined distance may comprise about 5 feet to about 15 feet, and in some embodiments, about 10 feet. Such predetermined distance of travel of the detection assembly, and consequently the load, may vary according to individual preferences and according to the specific application. Additionally, the predetermined distance of travel of the detection assembly, and consequently the load, is not necessarily limited to a distance of travel in the vertical direction. It is also possible that the indicator assembly be activated when the detection, assembly, and the load travel a predetermined distance in a substantially horizontal direction, in a substantially diagonal direction, or in a combination of directions.

It may also be desirable to activate the indicator assembly upon the occurrence of other types of events for which a warning is also useful. For example, the activation mechanism may be configured to activate the indicator assembly upon the occurrence of a lightning event within relatively close proximity to the detection assembly, and consequently the load. As an additional example, the activation mechanism may also be configured to activate the indicator assembly in the event that the detection assembly detects or determines an acceleration that exceeds a predetermined acceleration or threshold value of acceleration of the detection assembly, and consequently the load. Alternatively, the activation mechanism may be configured to activate the indicator assembly if the detection assembly detects or determines a velocity that exceeds a predetermined velocity of the detection assembly, and consequently the load.

The predetermined condition may also comprise the detection assembly detecting an object, such as a portable device carried by an individual, being located in a specific location, such as within sufficient proximity to the detection assembly, and consequently the load. For example, an individual(s) may carry a portable device according to the present invention, and upon the detection assembly, and consequently the load, being located in relatively close proximity to the individual(s), the activation mechanism may automatically activate the indicator assembly to warn the individual(s) of a potentially dangerous situation. Also as an example, the activation mechanism may activate the indicator assembly when the detection assembly, and consequently a load, is located substantially above an individual(s) carrying a portable device. In such instances, the activation mechanism may activate the indicator assembly even though the detection assembly, and consequently the load, may not necessarily be located in relatively close proximity to the individual(s) carrying the portable device(s).

There are instances when it may be advantageous to manually activate the indicator assembly. Thus, the activation mechanism may be configured to manually activate the indicator assembly. As used herein, the terms "manually control," or "manual control" refer to a manual activation, deactivation, or otherwise operation of the indicator assembly, including a visual indicator and/or a sound indicator. In order to enable a manual activation, the activation mechanism may comprise one or more activation structures disposed on the housing and configured to manually control the indicator assembly. The activation mechanism may also comprise an activation structure(s) disposed on an ancillary component, which is separate from the housing, and which an individual may carry to remotely control the indicator assembly. For example, such ancillary component may comprise a remote control that may emit a radio frequency configured to manually control the indicator assembly. Furthermore, the remote control may comprise an activation structure(s), such as a button(s), disposed thereon and configured to manually activate, and/or deactivate, the indicator assembly. Regardless of whether activation mechanism is disposed on the housing or on an ancillary component, one single activation structure may be used to control both the sound indicator and the visual indicator of the indicator assembly. Conversely, one activation structure may be used to control the visual indicator, while a different activation structure may be used to control the sound indicator.

As mentioned above, the indicator assembly may comprise a sound indicator such as an alarm or a buzzer. For example, the alarm or buzzer may be capable of emitting a sound alarm of about 120 decibels (db). Also as mentioned above, the indicator assembly may also comprise a visual indicator(s) in addition to, or in lieu of, the sound indicator. The visual indicator may comprise a light such as a flashlight, or an intermittent light, which may be observable under typical daylight conditions, and also in a substantially dark environment. It is within the scope of the present invention that the indicator assembly be activated immediately after occurrence of the predetermined condition. Additionally, it may be desirable to delay activation or deactivation of the indicator assembly. For example, it may not be necessary to warn an individual(s) about a load that is substantially at ground level, such as when it is being mounted onto the transporting equipment. Thus, it may be desirable to activate the indicator assembly once the load is mounted and it has traveled a certain distance away from initial mounting position. Therefore, activation of the indicator assembly, and specifically the sound indicator and/or the visual indicator, may be intentionally delayed by a predetermined period of time, which may vary according to the specific need or preference. Also as an example, activation of the indicator assembly may be internationally delayed by a period of time that substantially accounts for the travel distance and/or time of travel of the load, so that the indicator assembly is only activated when the load approaches a specific area, such as an area where staff, personnel, or other individuals may be located.

Additional features of the warning assembly according to the present invention comprise a battery assembly. The battery assembly may be configured to provide the electrical current necessary for operation of the detection assembly, the indicator assembly, and/or the activation mechanism. The battery assembly may comprise a removable battery pack, which may be configured for use with one or more individual batteries. The battery assembly may be removably disposable on the housing. Alternatively, the battery assembly may be built into the housing. The battery assembly may comprise a rechargeable battery pack. In one embodiment, the present invention incorporates a solar-powered rechargeable battery assembly.

As mentioned above, the present invention is also directed towards a method of using the inventive warning assembly. The method according to the present invention includes providing a warning assembly that is attachable to load transporting equipment. The warning assembly comprises a housing with a detection assembly and an indicator assembly disposed thereon. The warning assembly further comprises an activation mechanism operatively connected to the indicator assembly and to the detection assembly and configured to activate the indicator assembly. The method further comprises disposing the housing on load transporting equipment. The method further comprises using the activation mechanism to automatically activate or deactivate the detection assembly upon the occurrence of a predetermined condition. This predetermined condition may comprise the detection assembly, when mounted on and/or connected to the load, and being movable therewith, exceeding at least a vertical distance of about 5 feet to about 15 feet, and in some embodiments about 10 feet, from an initial position. The method further comprises using the activation mechanism to manually control the indicator assembly.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION

Figure 1:
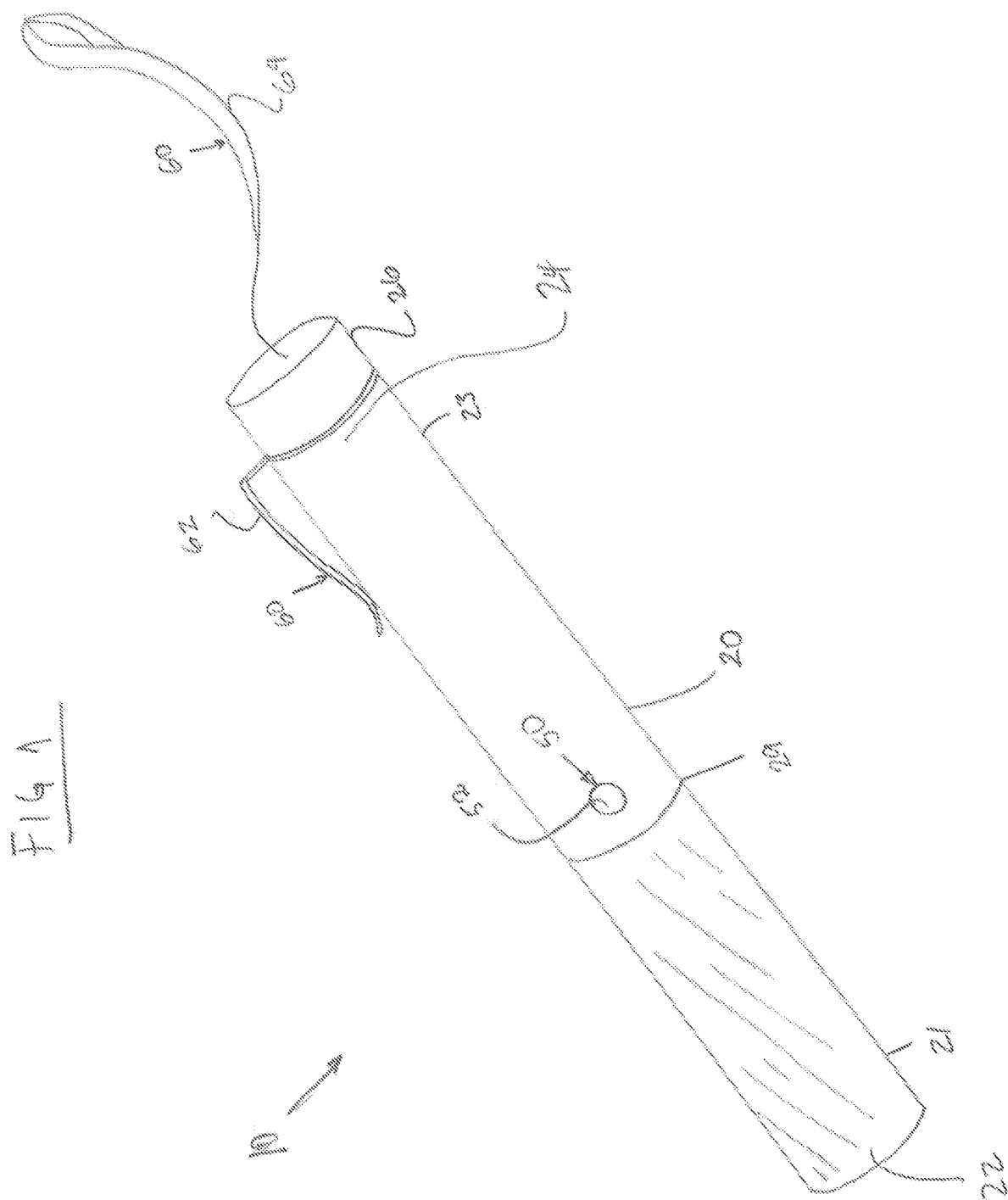
FIG. 1 is a perspective view of one illustrative embodiment of the warning assembly according to the present invention.

The present invention is directed towards a warning assembly, indicated as 10, which may be attached to load transporting equipment or load transporting machinery. As used herein, attaching the warning assembly 10 to the load transporting equipment includes attaching it to the load transporting equipment and/or machinery, or to a container, bucket, pallet, band, strap, or other fastening mechanism or structure, that secures and/or carries the load, or when feasible, to the load itself. Thus, it is within the scope of the present invention that the warning assembly 10 travel or move substantially together with the load being transported. The present invention is also directed towards a corresponding method 200 of using the inventive warning assembly 10 during a load transporting operation(s). The warning assembly 10 according to the present invention is intended to draw the attention of an individual(s) towards an event for which a warning may be useful. Such event may be a dangerous condition, such as may be associated with a load transporting operation(s). For example, such a dangerous condition may be created by an overhead load being transported. The individual(s) may include a bystander(s), passerby(s), members of the public, construction personnel, vehicle drivers, or other individuals who may come within relatively close proximity to an area where load transporting equipment and/or machinery is operated. Additionally, it is also intended that the inventive warning assembly 10 warn other groups of individual(s) that the underlying equipment and/or machinery is transporting a load. These other groups may include the operator(s) of the underlying machine and/or equipment, and all other associated personnel involved in the load transporting operation(s). As a non-limiting example, the underlying load transporting equipment and/or machinery may be a crane, such as, but not limited to, a mobile crane, tower crane, telescopic crane, truck-mounted crane, loader crane, or overhead crane. Also as an example, the underlying machine or equipment may be a boom truck, a hoist, or rigging equipment. The present invention may also be used in connection with other equipment and/or machinery, which may include trucks, tractors, excavators, backhoes, forklifts, vehicles, drills, and other related equipment and/or machinery that may similarly create a risk danger to bystanders. The warning assembly 10 according to the present invention may be activated to visually and/or audibly warn an individual(s), such as a passerby or bystander, of the existence of a load within sufficient proximity, such as an overhead load directly above the individual(s).

In alternative embodiments, the warning assembly 10 according to the present invention may also be used as a general warning device in connection with an event(s) that does not necessarily represent a dangerous condition, but that may nonetheless require an individual's attention. For example, the warning assembly 10 may be used in connection with underwater applications. As will be explained in more detail hereafter, the warning assembly 10 may be visually and/or audibly appreciated by an individual(s) located within relative proximity thereto, including underneath the surface of a body of water such as an ocean, lake, river, pool, etc. As an example, the inventive warning assembly 10 may be used as a warning device in connection with underwater applications such as, but not limited to, scuba diving, snorkeling, swimming, etc.

Figure 2:
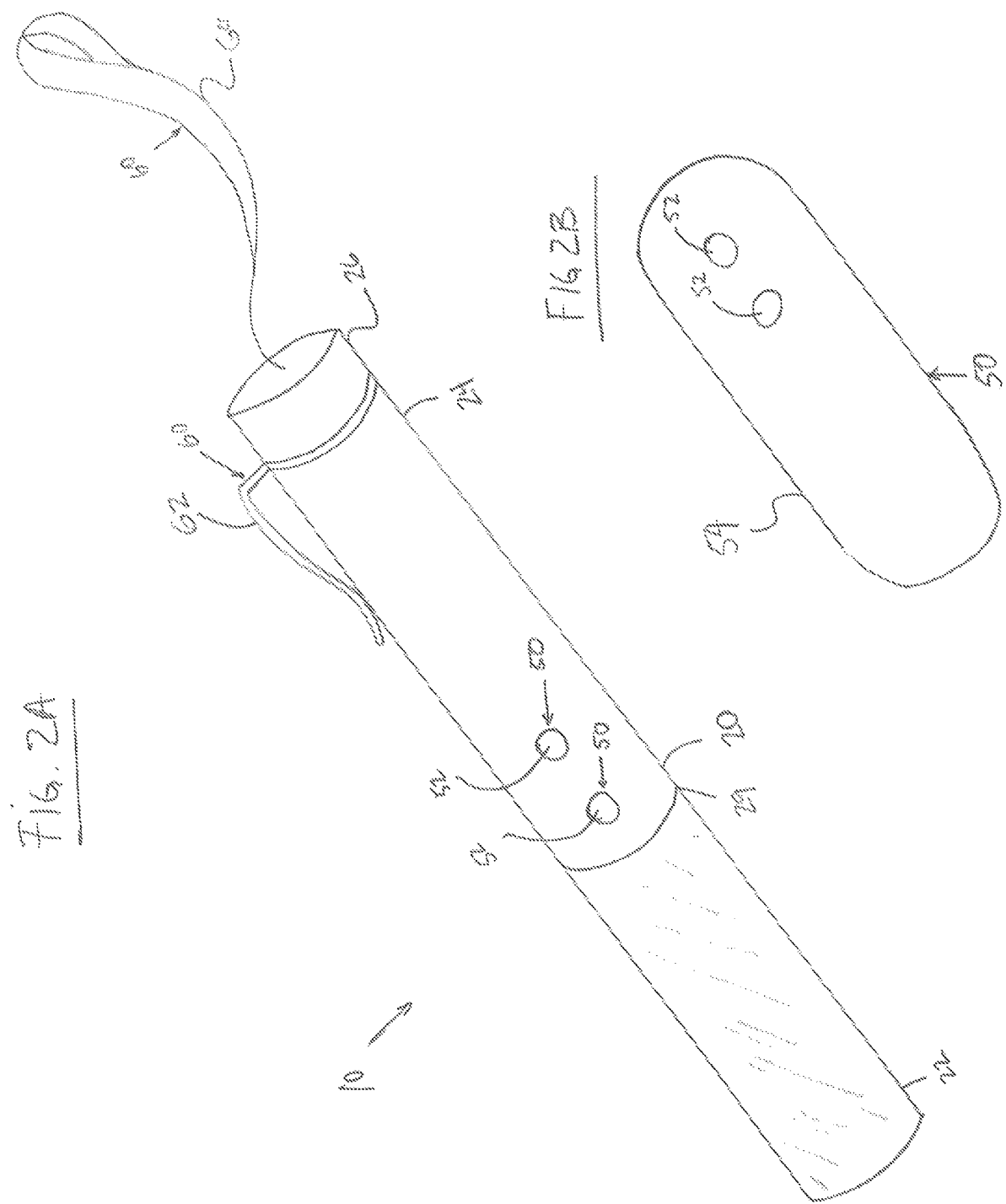
FIG. 2A is a perspective view of another illustrative embodiment of the warning assembly according to the present invention.
FIG. 2B is a perspective view of another illustrative embodiment of an ancillary component of the warning assembly according to the present invention.
Figure 3:
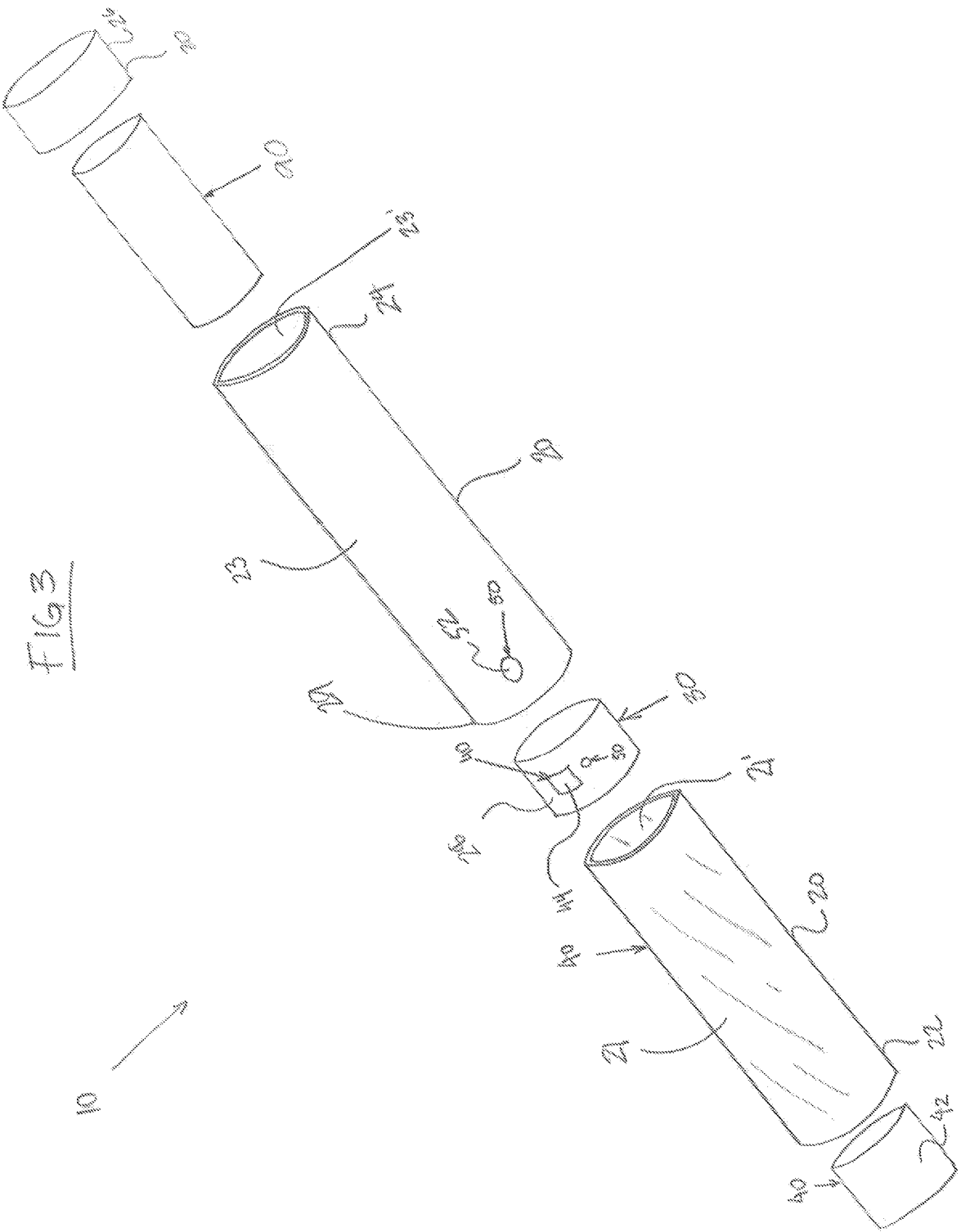
FIG. 3 is an exploded perspective view of one illustrative embodiment of the warning assembly according to the present invention.

With initial reference at least to FIGS. 1-3, the warning assembly 10 according to the present invention generally comprises a housing 20, an indicator assembly 40, an activation mechanism 50, and, as shown at least in FIG. 3, a detection assembly 30. The housing 20 may comprise a variety of shapes and sizes and is intended to enclose various components of the warning assembly 10. For example, the illustrative embodiments of FIGS. 1-3 show a warning assembly 10 with a housing 20 having a substantially cylindrical configuration. Although not necessarily required, a substantially cylindrical configuration is advantageous as it facilitates a grip on the housing 20. A substantially cylindrical configuration is also advantageous because a user may need to manually place the housing 20 at an intended location, such as a crane hook. This is also advantageous as the inventive warning assembly 10 may be used as a hand-held device. As may be appreciated in FIGS. 1-3, the housing 20 may comprise a proximal segment 21, and a distal segment 23. The proximal segment 21 and/or the distal segment 23 may comprise a substantially hollow configuration, so that the various other components of the inventive warning assembly 10 may be disposed therein. As may be appreciated from FIG. 3, each of the proximal segment 21 and the distal segment 23 may each comprise an interior channel, respectively indicated as 21' and 23'.

With further reference to FIG. 3, generally the detection assembly 30 and the indicator assembly 40 may be disposed on the housing 20. The illustrative embodiment of FIG. 3 shows a detection assembly 30 and an indicator assembly 40, which as shown in FIGS. 1-2A, may both be disposed inside of the housing 20. Similarly, a battery assembly 90, which may be used to provide the necessary current for operation of the different components of the warning assembly 10, may be provided with a substantially cylindrical configuration. As is shown in FIG. 3, the diameter of the interior channels 21' and 23' should be sufficient so that the various interior components of the warning assembly 10 may be disposed therein. These interior components of the warning assembly 10 may include the detection assembly 30, the indicator assembly 40, the battery assembly 90, and in some embodiments at least part of the activation mechanism 50. As shown in illustrative embodiment of FIG. 3, a visual indicator 42 may be disposed on the interior channel 21' of the proximal segment 21, such as around a distal end 24 of the housing 20. As is also shown in the illustrative embodiment of FIG. 3, a battery assembly 90 may be disposed on the interior channel 23' of the distal segment 23, such as around a proximal end 22 of the housing 20. The illustrative embodiment of FIG. 3 also shows a casing 28 which may be disposed on the distal end 24, around a middle portion 29 of the housing 20. The casing 28 may enclose components of the detection assembly 30, the indicator assembly 40, and/or the activation mechanism 50. As is shown in FIG. 3, a covering structure 23 may be disposed around the distal end 24 of the housing 20. By way of example only, this removable structure 23 may be a removable cap to provide access to the battery assembly 90.

Additional features of the housing 20 according to the present invention include providing an attachment assembly 60. The attachment assembly 60 generally comprises either or both of a first attachment structure 62, and a second attachment structure 64. The attachment assembly 60, is intended to attach or secure the warning assembly 10, and more specifically the housing 20, to the load, or to underlying equipment or machinery. As may be appreciated from FIGS. 1-2A, the first attachment structure 62 of the attachment assembly 60 may comprise a clip. As may also be appreciated from FIGS. 1-2A, the second attachment structure 64 of the attachment assembly 60 may comprise a strap. By way of example only, the attachment assembly 60 may also comprise another related structure which may facilitate attachment of the housing 20 to a component of the underlying equipment or machine such as, but not limited to, a lifting hook. The attachment assembly 60 may also be capable of attaching or otherwise securing the housing 20 directly on the load, or on a rig line. Accordingly, the attachment assembly 60 may also comprise a band, a magnet, a loop, or a similar attachment mechanism.

With reference again to FIG. 3, the detection assembly 30 is generally disposed on the housing 20, such as on an inside thereof. The detection assembly 30 is generally structured to determine the movement or displacement of the housing 20. The detection assembly 30 should be capable of determining the distance that the housing 20 moves relative to an initial position, and at least in a vertical direction. Thus, the detection assembly 30 may comprise an altimeter capable of making such a determination of the vertical position of the housing 20, and consequently the load, relative to a different position, such as an initial position. The initial position may be a location of the underlying equipment or machinery, or an adjacent area thereto, where a load may initially be mounted onto, or otherwise picked up by, the underlying equipment or machinery. For example, the initial position may be at ground level. Also as an example, the initial position may be at a different level of a building or structure, which may be higher or lower than ground level. Additionally, the detection assembly 30 may also be configured to determine displacement in the horizontal direction, of the housing 20 and the detection assembly 30, and consequently the load. Accordingly, the detection assembly may comprise global positioning system (GPS) capabilities, which are indicated as 34 in FIG. 5. Such GPS capabilities 34 may be used to determine the vertical, horizontal, and/or diagonal movement of the housing 20 and the detection assembly 30, and consequently the load.

Additional features of the detection assembly 30 according to the present invention include memory capabilities. The memory capabilities may be configured to record and/or store data associated with the position of the housing 20 and the detection assembly 30, and consequently the load. For example, this data may include measurements of the movement or displacement of the housing 20 and the detection assembly 30, and consequently the load, such as from an initial position to a subsequent position. Such movement or displacement of the housing 20 and the detection assembly 30, and consequently the load, is hereinafter referred to as a "movement cycle(s)." The data may also include the time of the day of each movement cycle(s). Furthermore, the memory capabilities may also record and/or store data associated with personnel in charge of the load transporting operations. For example, the memory capabilities may record and/or store data associated with the individual that performs an inspection of the load and underlying equipment and/or machinery prior to the transporting operation taking place. The memory capabilities may record and/or store the number of times during a specified timeframe, and the time of the day, in which the transporting operations occur.

Figure 8:
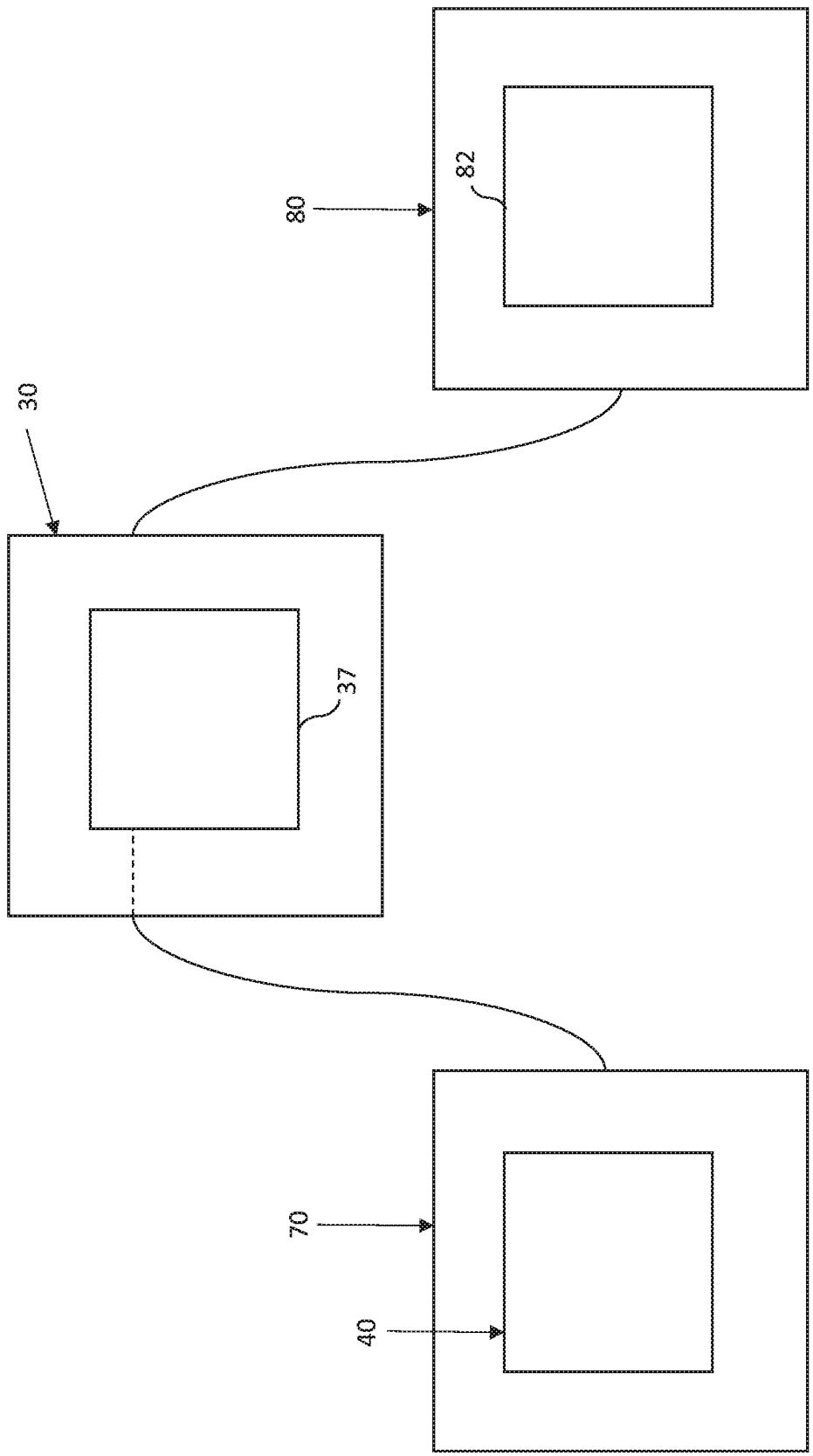
FIG. 8 is a diagrammatic representation of a portion of one embodiment of the warning assembly according to the present invention showing a portable device, a portable component, and a detection assembly.

An individual(s) may be provided with a portable component, schematically represented as 80 in FIG. 8, comprising radio frequency identification (RFID) capabilities. The portable component 80 may comprise a card, label, badge, or other related component, which may house suitable RFID parts such as chips, circuitry components, and other related components. If located within a sufficient proximity to the detection assembly 30, and consequently the load, the RFID capabilities may generate a unique record that may be stored on the memory capabilities. For example, such a record generated by the portable component 80 may comprise data associated with an individual performing a visual inspection of the load and/or the underlying equipment and/or machinery. The detection assembly 30 may thus record data associated with the portable component(s) 80. Additionally, the detection assembly 30 may also comprise a counting device, which may be also configured with the memory capabilities and/or the portable component 80, to count the number of times within a specified timeframe that the indicator assembly 40 is activated.

Furthermore, the memory capabilities may also store predetermined parameters such as specific elevations, coordinates, travel distances, weather conditions, acceleration and/or velocity of the housing 20 and the detection assembly 30, and consequently the load, or other parameters. As will be explained in further detail below, such parameters may serve as threshold values for automatic activation of the indicator assembly 40. Additionally, it may be desirable to record data associated with a "movement cycle(s)" of the detection assembly 30, and consequently the load. For example, the memory capabilities and/or the RFID capabilities may be configured to record data associated with a "movement cycle(s)" such as duration, travel distances, the individual(s) responsible for performing inspections, the total man-hours involved in a load transporting operation(s), etc. It is also within the scope of the present invention that a specific portable component(s) 80 be configured to store data associated with a specific characteristic of the load transporting operation(s). For example, a specific individual(s) responsible for performing inspections may be provided with a portable component 80 configured to record data associated only with an inspection(s), while a different individual in charge of performing rigging activities may be provided with a different portable component 80 structured to record data associated only with the rigging activities. Also as an example, a specific individual(s) may be provided with a unique portable component 80 which may record data associated with the "movement cycle" of a fresh concrete bucket.

Figure 5:
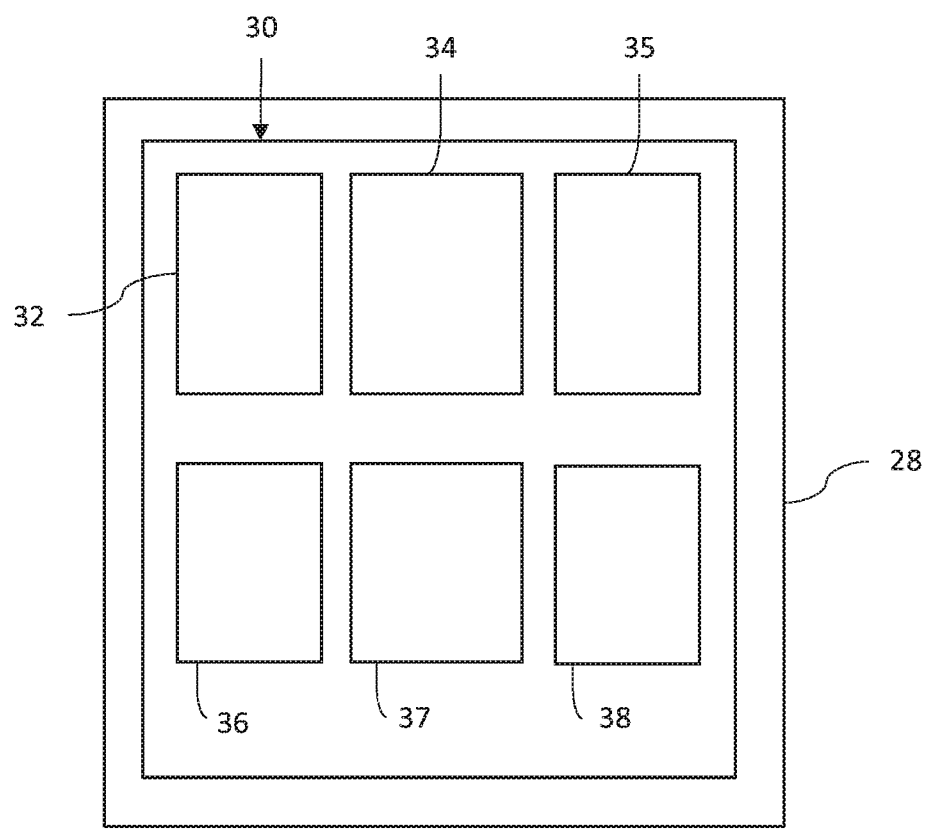
FIG. 5 is a diagrammatic representation of another embodiment of a casing of the warning assembly according to the present invention comprising a detection assembly.
Figure 6:
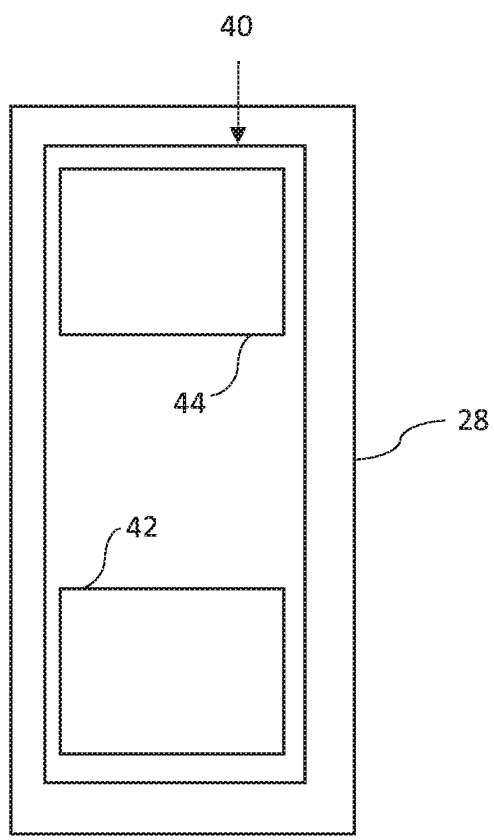
FIG. 6 is a diagrammatic representation of yet another embodiment of a casing of the warning assembly according to the present invention comprising an indicator assembly.
Figure 7:
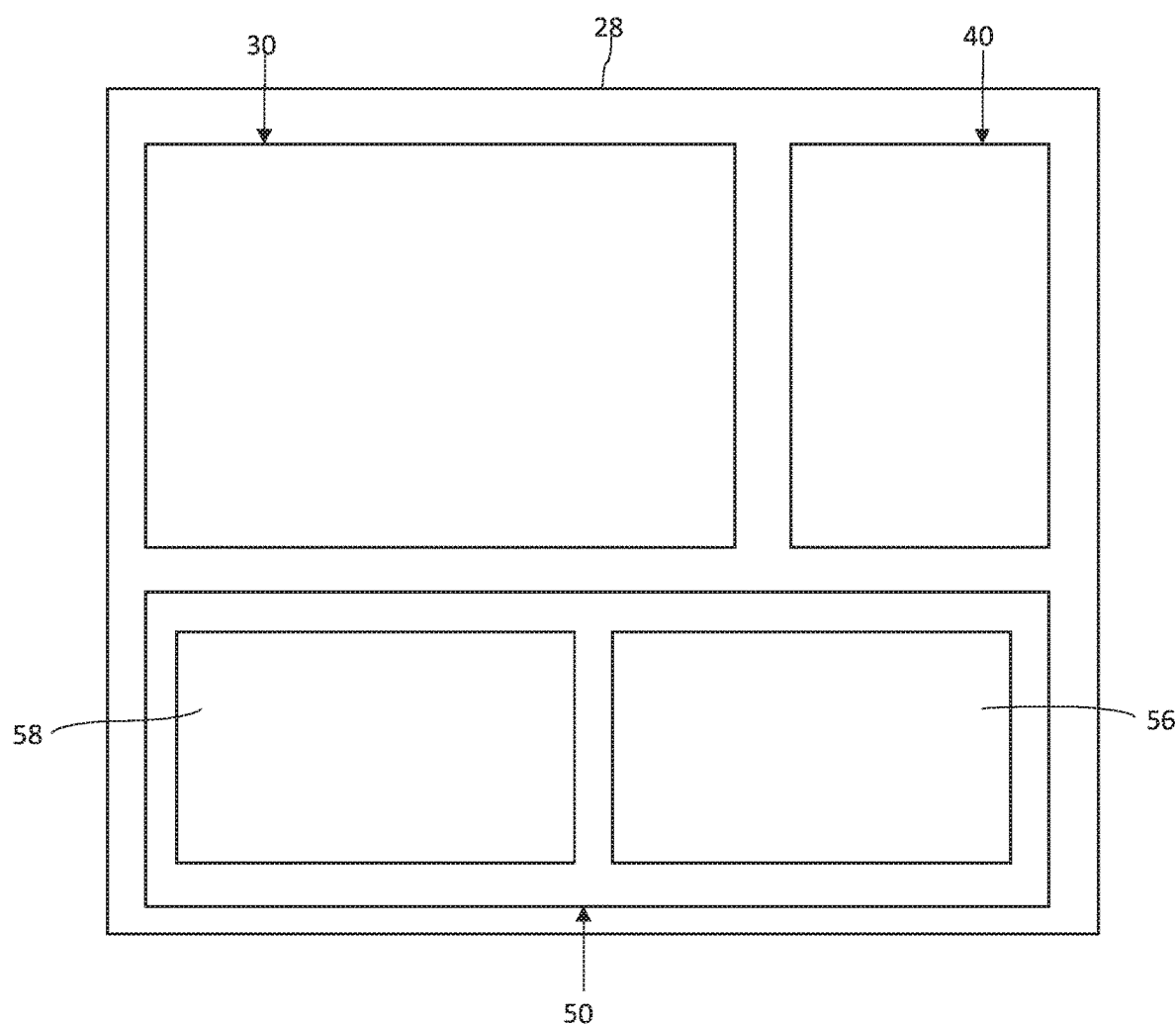
FIG. 7 is a diagrammatic representation of even another embodiment of a casing of the warning assembly according to the present invention comprising an indicator assembly, a detection assembly, and an activation mechanism.

With reference now to FIG. 5, even additional features of the present invention include providing an acceleration measuring device 35. The acceleration measuring device 35 may be disposed on the detection assembly 30, such as inside of casing 28, and may be structured to determine at least an acceleration of the housing 20, and consequently the load. The acceleration measuring device 35 may also be structured to determine a velocity of the housing 20, and consequently the load. The detection assembly 30, and more specifically the acceleration measuring device 35, may be cooperatively structured with the activation mechanism 50 to automatically activate the indicator assembly 40 upon the velocity and/or acceleration of the housing 20 exceeding a predetermined value. Thus, if the housing 20 and the detection assembly 30, and consequently the load, reach such predetermined value(s) of velocity and/or acceleration, this may serve as an indicator that a load is currently being transported, or that a "movement cycle" is currently taking place, so that the indicator assembly 40 may be automatically activated.

With reference again to FIG. 5, additional features of the warning assembly 10 according to the present invention include proximity capabilities 37. The detection assembly 30 may comprise proximity capabilities 37 that may be operatively configured with a portable device(s), which is indicated as 70 in FIG. 8. The portable device(s) 70 may be used to activate the indicator assembly 40. For example, the proximity capabilities 37 of the detection assembly 30 may be configured such that if the portable device(s) 70 is placed within sufficient proximity to the detection assembly 30, then the indicator assembly 40 is automatically activated. It is within the scope of the present invention that more than one portable device 70 be used according to the specific application and the number of individuals associated with the specific load transporting operation. Therefore, if either of the portable devices 70 come within sufficient proximity to the detection assembly 30, and consequently the load, then the indicator assembly 40 may be automatically activated.

Figure 4:
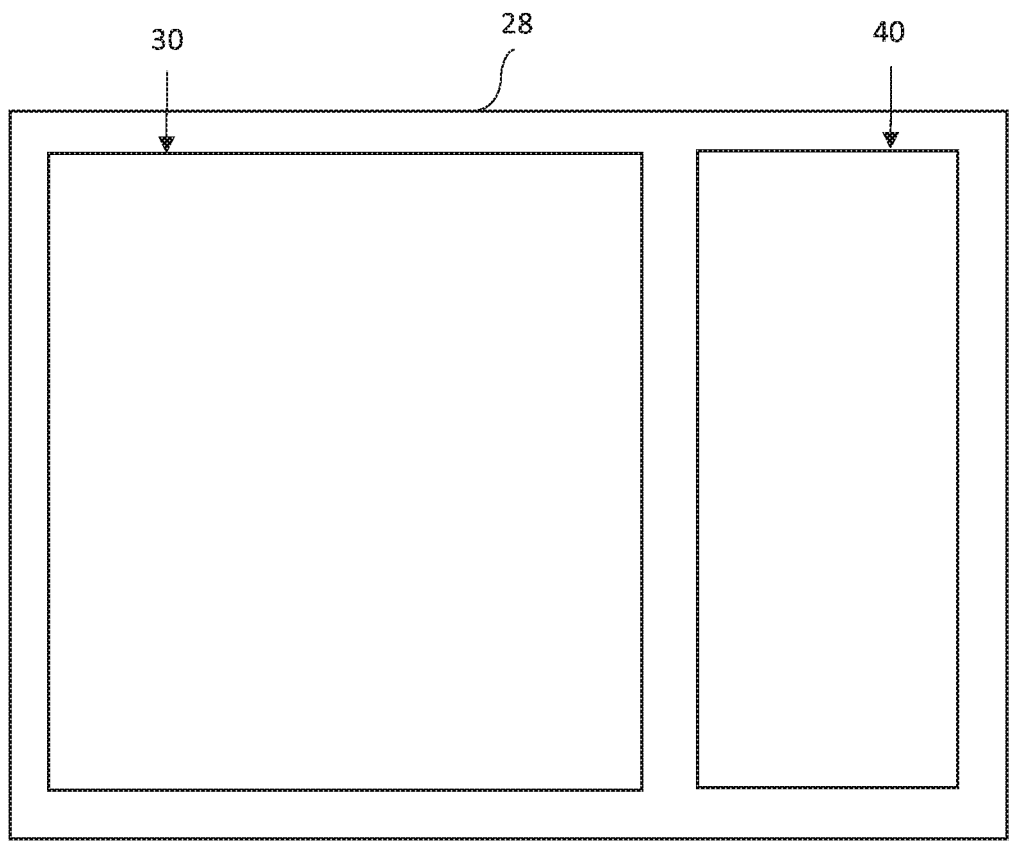
FIG. 4 is a diagrammatic representation of one embodiment of a casing of the warning assembly according to the present invention comprising a detection assembly and an indicator assembly.

With reference to FIG. 4, yet additional features of the warning assembly 10 according to the present invention comprise providing a lightning detector 38. The detection assembly 30 may comprise a lightning detector 38, which may be disposed on the casing 28, and which should be capable of activating the indicator assembly 40 if a lightning event occurs within sufficient proximity to the detection assembly 30, and consequently the load.

With reference now to FIGS. 1-3, and FIG. 7, and as mentioned above, the warning assembly 10 according to the present invention generally comprises an an activation mechanism 50. The activation mechanism 50 may be disposed on an inside of the housing 20. As an illustrative example, the activation mechanism 50 may be disposed on either or both of the interior channels 21' and 23' respectively of the proximal segment 21 and distal segment 23. Generally, the activation mechanism 50 is operatively connected to the indicator assembly 40. The activation mechanism 50 may be configured to "manually control" the indicator assembly 40. As used herein, the terms "manually control" mean activate, deactivate, or otherwise regulate operation of, the indicator assembly 40. Additionally, the activation mechanism 50 may be configured to automatically activate the indicator assembly 40. Automatic activation, or deactivation, of the indicator assembly 40 may occur without manually of the activation mechanism 50. For example, as may be appreciated in FIG. 7, the activation mechanism 50 may comprise an internal activation component 58 structured to automatically activate the indicator assembly 40. Additionally, such automatic activation of the indicator assembly 40 may be done upon the occurrence of a predetermined condition, which will be later explained in greater detail. Thus, the activation mechanism 50 may also be operatively connected to the detection assembly 30, to automatically activate the indicator assembly 40 when the detection assembly 30 detects or determines the occurrence of such a predetermined condition. The activation mechanism 50 may activate either or both of the visual indicator 42 and the sound indicator 44 upon the occurrence of the predetermined condition.

The predetermined condition may include various events, which are described hereafter. The predetermined condition may comprise the housing 20, and more specifically the detection assembly 30 disposed thereon, moving, traveling, or otherwise being transported a predetermined distance or for a predetermined period of time. This predetermined distance may be in a substantially vertical direction. For example, in some load transporting applications, it may be desirable to automatically activate the indicator assembly 40 only after the load(s) has been securely mounted or placed onto the underlying equipment and/or machinery, and only after the load has already traveled a certain distance. Further to this example, in load transporting applications, the individual in charge of performing an inspection(s) may prefer that the indicator assembly 40 be activated after the load has already traveled a predetermined distance away from the individual. This may be advantageous, for example, when a sound indicator 44 of about 120 db is activated. Therefore, the predetermined condition may comprise the housing 20 and the detection assembly 30, and consequently the load, traveling a predetermined distance from an initial loading position. Such predetermined distance may be in a substantially vertical direction from the initial loading position.

The predetermined condition may also comprise the housing 20 and the detection assembly 30, and consequently the load, traveling a predetermined distance in a substantially horizontal direction, in a substantially diagonal direction, or in a combination of different directions. The predetermined condition may also comprise the housing 20 and the detection assembly 30, and consequently the load, traveling a predetermined distance in a substantially parabolic or similar trajectory or path, or an uneven trajectory or path. As an illustrative example, the predetermined condition may comprise the housing 20 and the detection assembly 30, and consequently the load, traveling a predetermined distance of about 5 feet to about 15 feet in a substantially vertical direction. Also as an example, the predetermined distance of travel of the housing 20 and the detection assembly 30, and consequently the load, may also comprise about 10 feet in a substantially vertical direction. As a further example, the predetermined condition may comprise a housing 20, the detection assembly 30, and the load, traveling a distance of about 5 feet to about 15 feet in any direction, or combination thereof. Other combinations of directions and distances of travel are also possible. The foregoing non-limiting examples are only provided for illustrative purposes. It is contemplated that the predetermined distance of travel of the housing 20, and the load, may change according to individual needs, individual preferences, and the specific load transporting application. Similarly, the predetermined condition may comprise the detection assembly 30, and consequently the load, moving or traveling in any of the foregoing directions for a predetermined period of time. Such predetermined period of time may be about 1 second to about 10 seconds, or more, according to the preference and to the specific application. In some embodiments the predetermined period of travel is about 3 seconds.

The indicator assembly 40 may also be automatically activated upon the occurrence of other types of events for which a warning would be useful. For example, the activation mechanism 50 may be configured to activate the indicator assembly 40 upon the occurrence of a lightning event within sufficient proximity to the detection assembly 30, and consequently the load. As an additional example, the activation mechanism 50 may also be configured to automatically activate the indicator assembly 40 in the event that the detection assembly 30 detects or otherwise determines that the housing 20, and consequently the load, are traveling at an acceleration that exceeds a predetermined acceleration, or threshold value of acceleration, which may be indicative of an ongoing load transporting operation or movement cycle. Alternatively, the activation mechanism 50 may be configured to activate the indicator assembly 40 if the detection assembly 30 detects or determines that the housing 20, and consequently the load, are traveling at a velocity that exceeds a predetermined velocity or threshold value of velocity, which may also be indicative of an ongoing load transporting operation or movement cycle.

The predetermined condition may also comprise the detection assembly 30 detecting that an object, such as a portable device 70 according to the present invention, is located within sufficient proximity to the detection assembly 30, and consequently to the load itself. Such an event may be indicative of a dangerous situation, such as a nearby load or an overhead load. For example, an individual(s) may carry a portable device 70 according to the present invention, and upon the detection assembly 30 determining that there is a portable device 70 located within sufficient proximity to the detection assembly 30, and consequently to the load, the activation mechanism 50 may automatically activate the indicator assembly 40. As a non-limiting example, the indicator assembly 40 may be activated if the portable device 70 is located within a radius of about 25 feet from the detection assembly 30. As a further non-limiting example, the indicator assembly 40 may be activated if the portable device is located within a vertical distance that about 75 feet, or less. Also as an example, the activation mechanism 50 may activate the indicator assembly 40 when the detection assembly 30, and consequently a load, is located substantially above an individual(s) carrying a portable device 70. During such an event, the activation mechanism 50 may automatically activate the indicator assembly 40, even though the housing 20, and consequently the load, may not necessarily be within relatively close physical proximity to the individual(s) carrying the portable device 70. Furthermore, the indicator assembly 40 may be at least partially disposed on the portable device 70. For example, as may be appreciated from FIG. 8, the portable device 70 may comprise a sound indicator 44. The sound indicator 44 may comprise a speaker or other related device, capable of emitting a sound alarm. As an illustrative example, a portable device 70 may be provided with a "mini-buzzer" capable of emitting a sound alarm which may be appreciated within relatively close proximity, such as for example within 75 feet or less.

The "mini-buzzer" may be configured to gradually increase the volume of the sound alarm as the detection assembly 30 and/or the portable device 70 approach one another. The "mini-buzzer" may also be configured to gradually increase the volume of the sound alarm as the detection assembly 30 approaches a location substantially above the individual carrying portable device 70, or as the individual approaches a location substantially below the detection assembly 30. Alternatively, the "mini-buzzer" may emit a sound alarm comprising a variable tone and/or pattern according to the distance between the detection assembly 30 and the portable device 70, or when the detection assembly 30, and consequently the load, is above the individual carrying the portable device 70. The portable device 70 may also comprise a vibration device that may be configured to gradually increase its level of vibration as the individual carrying the portable device 70 gets closer to the detection assembly 30, and consequently the load, or vice versa. The vibration device may also be configured to gradually increase its level of vibration as the detection assembly 30 approaches a location substantially above the individual carrying the portable device 70, or as the individual approaches a location substantially below the detection assembly 30.

With reference to FIGS. 1-3, yet additional features of the present invention comprise providing an activation mechanism 50 with an activation structure(s) 52 configured to manually activate the indicator assembly 40. The activation mechanism 50 may comprise an activation structure(s) 52 disposed, at least in part, on the housing 20. The activation structure(s) 52 is generally configured to manually control the indicator assembly 40. By way of example only, the activation structure(s) 52 may comprise a button, a switch, a knob, or another related component. The activation structure(s) 52 may be disposed on an outside of the housing 20 to manually control the indicator assembly 40. Additionally, as shown in FIG. 2B, the activation mechanism 40 may comprise an ancillary component, indicated as 54. The ancillary component 54 may comprise a suitable wireless component(s) cooperatively configured with the indicator assembly 40. For example, the ancillary component 54 may comprise a radio frequency emitter cooperatively structured with the indicator assembly 40. Several ancillary components 54 may comprise a radio frequency emitter selectively disposable into a predetermined frequency to manually control the indicator assembly 40. As an example, the ancillary component 54 may comprise a remote control with an activation structure(s) 52, such as a button(s), configured to manually control the indicator assembly 40. Further to this example, the ancillary component 54 may have a working range of about 90 feet.

As shown at least in FIG. 1, a single activation structure 52 may be disposed on the housing 20. As shown in FIG. 2B, a single activation structure 52 may be disposed on the ancillary component 54, which may be in addition to, or in lieu of, a different activation structure 52 disposed on the housing 20, which is shown in FIG. 2A. A single activation structure 52 may be configured to control both the sound indicator 44 and the visual 42 indicator of the indicator assembly 40. For example, a single activation structure 52 may simultaneously control both the sound indicator 44 and the indicator assembly 42. As is shown in FIG. 2A, two different activation structures may be disposed on the housing 20. As shown in FIG. 2B, two different activation structures 52, may be disposed on the ancillary component 54. In the illustrative embodiments as represented in FIGS. 2A and 2B, one activation structure 52 may be configured to control the visual indicator 42, while a different activation structure 52 may be configured to control the sound indicator 44. Each activation structure(s) 52 may be configured to execute different controls of the indicator assembly 40.

Depending on the application, it may be beneficial to provide different lighting and/or sound patterns of the indicator assembly 40. For example, if load transporting operations are conducted at times and/or places in which there are existing noise restrictions, it may be advantageous to only activate the visual indicator 42 and not the sound indicator 44. Accordingly, the proximal segment 21 may comprise a substantially translucent or transparent material so that a lighting pattern inside of the housing 20, may be viewable from outside of the housing 20. As may be appreciated from FIG. 3, the indicator assembly 40 may be at least partially disposed inside of the interior channel 21' of the proximal segment 21, and around the proximal end 22 of the housing. The illustrative embodiment as represented in FIG. 3 shows an indicator assembly 40 comprising a visual indicator 42 disposed on an inside channel 21' of the proximal segment 21. An additional visual indicator(s) 42 may be disposed the housing 20, such as on a different location thereof. For example, a first visual indicator 42 may be disposed around a proximal end 22 of the housing 20, which a second visual indicator 42 may be disposed around a distal end 24 of the housing 20. Furthermore, the indicator assembly 40 may comprise an adjustable volume control structure disposed on the housing 20, structured to control the volume of the sound indicator 44. Thus, a user may manually adjust the volume control structure to increase or decrease the volume of the sound indicator 42.

As used herein a manual triggering refers to a single click, push, press, switch, or similar action, of an activation structure 52, which results in an activation or deactivation of, or which otherwise controls, the indicator assembly 40. As an illustrative example, an initial manual triggering may initiate a certain lighting pattern of the visual indicator 42, while a subsequent manual triggering, or subsequent consecutive manual triggerings, may initiate a different lighting pattern of the visual indicator 42. Such a lighting pattern may comprise an intermittent lighting pattern, or a random lighting pattern. Also as an illustrative example, an initial manual triggering may activate the visual indicator 42 to show one lighting color or lighting pattern, while a subsequent manual triggering(s) may activate the visual indicator 42 to show a different lighting color or lighting pattern. Further to the foregoing example, one lighting color scheme may be used to manage vehicular traffic, while a different lighting color scheme may be used in connection with load transporting operations. As a further illustrative example, one manual triggering may activate the sound indicator 44, while a subsequent manual triggering(s) may deactivate the sound indicator 44. It is within the scope of the present invention that the sound indicator 44 be able to reproduce different sound patterns and/or tones. Accordingly, the activation structure(s) 42 may be configured so that different initial and/or subsequent manual triggerings activate different sound patterns and/or tones. For example, an initial manual triggering may prompt the sound indicator 44 to emit a specific sound pattern, while a subsequent manual triggering(s) may prompt the sound indicator 44 to emit a different and random sound pattern.

Different initial and/or subsequent manual triggerings may be configured to simultaneously, or asynchronously, control the visual indicator 42, and/or the sound indicator 44, to achieve other combinations of different arrangements of lighting colors, lighting patterns, and/or sound alarms. Such arrangements may be achieved irrespective of whether the activation assembly 40 is activated automatically or manually. Different individual arrangements or configurations of lighting patterns of the visual indicator 42, and/or sound patterns of the sound indicator, may be configured to correspond to the various events associated with the predetermined condition. Additionally, different arrangements are also possible for a manual triggering(s) of the activation structure(s) 52. As an example, a first activation structure 52 may be used to manually control the visual indicator 42, while a second activation structure 52 may be used to manually control the sound indicator 44. In the foregoing example, a first and initial manual triggering of the second activation structure 52 may prompt the sound indicator 44 to emit a sound alarm that is about 60% of an intended sound volume, a second subsequent manual triggering may prompt the sound indicator 44 to emit a sound alarm that is about 100% of the intended sound volume, and a third subsequent manual triggering may deactivate the sound indicator 44. Further to the foregoing example, about 100% of an intended sound volume may comprise 120 db to comply with notice requirements of the Occupational Safety and Health Administration (OSHA). Accordingly, an initial manual triggering may generate a sound alarm of about 72 db, or about 60% of 120 db, while a subsequent manual triggering may generate a sound alarm of about 120 db. Other variations are also possible. An initial manual triggering may generate an alarm that is less than the intended sound volume, two consecutive and subsequent manual triggerings may generate an alarm that is about equivalent to the intended sound volume, and three subsequent manual triggerings may deactivate the sound indicator 44.

The inventive warning assembly 10 may be further configured for use in connection with other specific events. For example, the warning assembly 10 may be used to provide a warning during an emergency. A predetermined number of manual triggerings may activate a unique sound and/or visual pattern of the indicator assembly 40 associated with such instances. For example, the warning assembly 10 may be configured so that a minimum of four (4) successive triggerings activate a unique sound and/or visual pattern of the indicator assembly 40 that is associated with an emergency. Such unique sound and/or visual pattern of the indicator assembly 40 may also be associated with an evacuation signal. As a further example, during such other specific events, including emergency situations, a unique ancillary component(s) 54, which may be provided only to a specific individual(s), may be cooperatively configured to activate the unique sound and/or visual pattern of the indicator assembly 40 associated with the specific event. As an even further example, during such specific event, the visual indicator 42 and/or sound indicator 44 may be configured so that activation thereof may not stop for a predetermined period of time.

Even further features of the present invention comprise a delayed activation of the indicator assembly 40 after occurrence of the predetermined condition. Although the indicator assembly 40 may be activated immediately upon occurrence of a predetermined condition, in some instances it may be desirable to delay activation of the indicator assembly 40 by a predetermined period of time after occurrence of the predetermined condition. For example, as may be appreciated from FIG. 7, the activation mechanism 50 may comprise a timer 56 configured to delay activation of the indicator assembly 40. Activation of either or both of the visual indicator 42 and the sound indicator 44 may be delayed by a predetermined period of time. Additionally, deactivation of either or both of the visual indicator 42 and the sound indicator 44 may also be delayed by a predetermined period of time. Such predetermined period of time may vary according to the specific need or preference. The activation mechanism 50 may comprise an adjustable dial(s), in addition to or in lieu of an activation structure(s) 52, which may serve to selectively choose between different predetermined periods of delay associated with activation of the indicator assembly 40. The adjustable dial(s) may also be used to control the time of activation of the indicator assembly 40. The adjustable dial may be selectively disposed into a variety of operative positions associated with different periods of time of delay or actual activation or operation of the indicator assembly 40. For example, the adjustable dial may be selectively disposed into a variety of operative positions associated with a specific activation period of the visual indicator 42 and/or the sound indicator 44. The adjustable dial(s) may also be selectively disposed into a variety of operative positions associated with a specific delay period associated with activation of the visual indicator 42 and/or the sound indicator 44. As an example, the delay period of activation of the indicator assembly 40 may be from about 1 second to about 15 seconds, or more. Different operative positions of the adjustable dial(s) may be configured in increments of approximately 1 second, or more as desired or according to the specific need. Additionally, the adjustable dial may be selectively disposed into a variety of operative positions associated with a specific volume level of the sound indicator 44. Alternatively, the adjustable dial may be selectively disposed into a variety of operative positions associated with a specific sound pattern and/or tone of the sound indicator 44.

It may be advantageous to automatically deactivate the indicator assembly 40 after a load carrying operation, or a movement cycle, is completed and no longer represents a risk of danger. For example, the indicator assembly 40 may be automatically deactivated once an overhead load has been transported to an intended location. Thus, the indicator assembly 40 may be automatically deactivated after a predetermined period of time following its activation. Alternatively, the indicator assembly 40 may be automatically deactivated after the housing 20, and the detection assembly 30, travel a predetermined distance following its activation.

Even additional features of the present invention comprise providing a battery assembly 90 capable of providing the necessary current for operation of the different components of the inventive warning assembly 10. The battery assembly 90 may provide the current necessary for operation of the detection assembly 30, the indicator assembly 40, and/or the activation mechanism 50. The battery assembly 90 may comprise a battery pack, which may be removable, or which alternatively may be connected to, or permanently disposed on, the housing 20. The battery pack may be configured for use with one or more individual batteries. It is within the scope of the present invention that the battery assembly 90 be rechargeable. Thus, the battery assembly 90 may comprise a rechargeable battery or batteries, or a rechargeable battery pack. Additionally, the warning assembly 10 may comprise a solar-powered rechargeable battery assembly 90.

Figure 9:
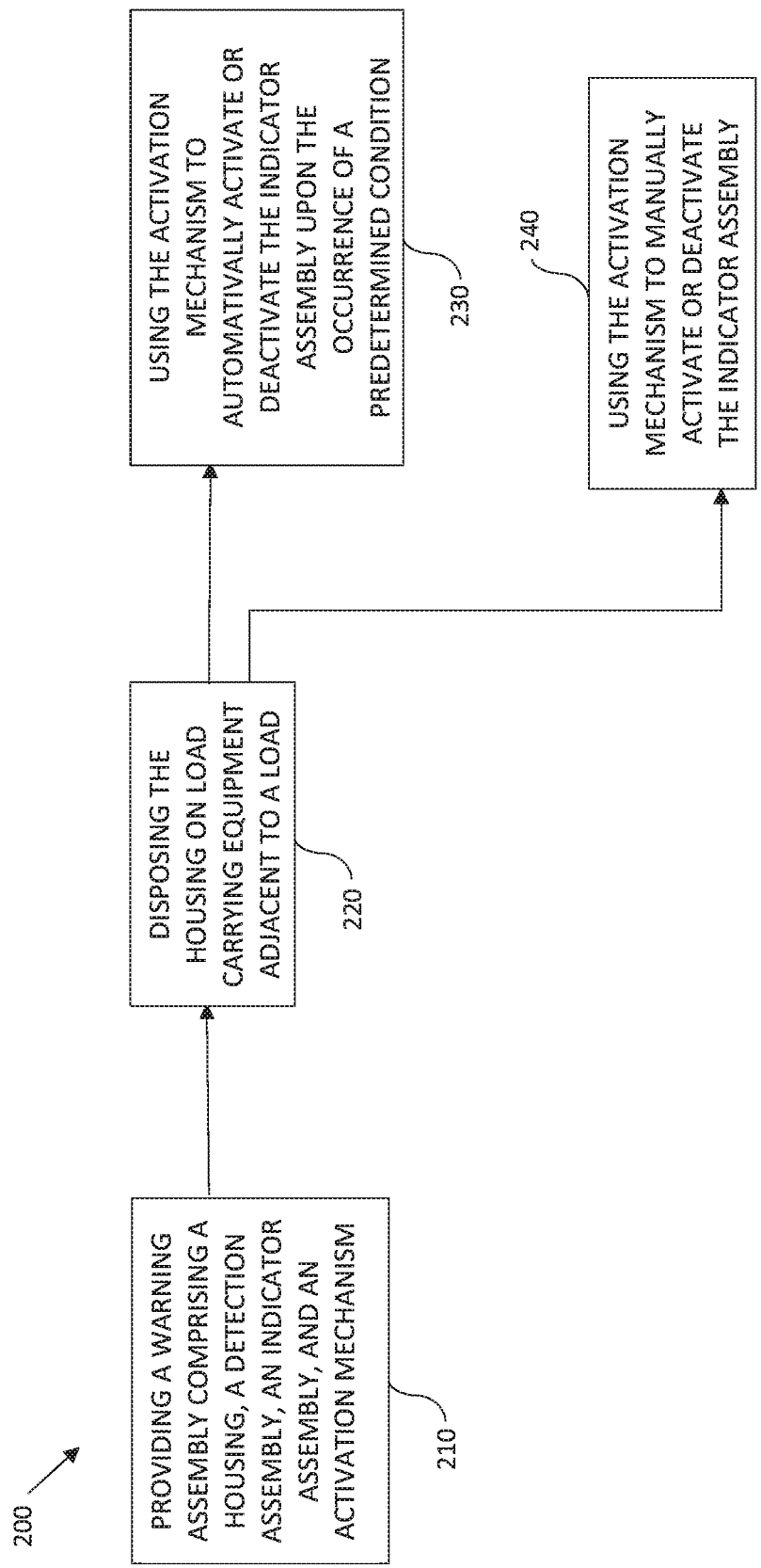
FIG. 9 is a diagrammatic representation of one embodiment of a method of using the warning assembly according to the present invention.
Figure 10:
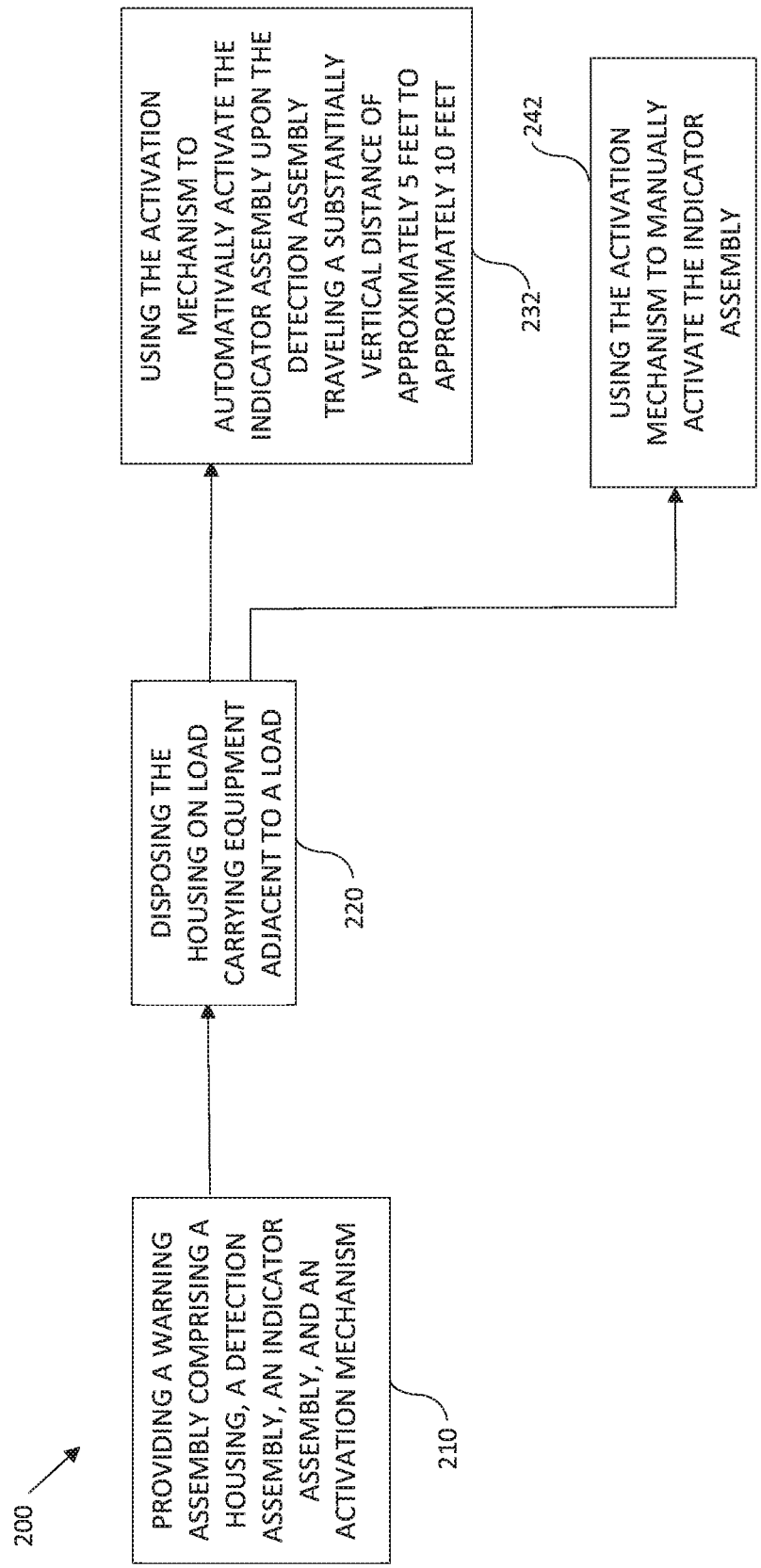
FIG. 10 is a diagrammatic representation of another embodiment of a method of using the warning assembly according to the present invention.

As previously mentioned, and with reference now to FIGS. 9-10, the present invention is also directed towards a method 200 of using the inventive warning assembly 10. As may be appreciated from FIGS. 9 and 10, the method 200 comprises providing a warning assembly 10 according to the present invention 210. The warning assembly 10 should be attachable to load transporting equipment and generally comprises a housing 20, a detection assembly 30, an indicator assembly 40, and an activation mechanism 50. The detection assembly 30, indicator assembly 40 are generally disposed on the housing 20. The activation mechanism 50 may be at least partially disposed on the housing 20, but may also be partially disposed on an ancillary component 54. The activation mechanism 50 is operatively connected to the indicator assembly 40 and to the detection assembly 30, and is configured to activate the indicator assembly 40. As may also be appreciated from FIGS. 9 and 10, the method 200 further comprises disposing the housing 20 on the load transporting equipment 220. As may be appreciated in FIG. 9, the method 200 further comprises using the activation mechanism 50 to automatically activate or deactivate the detection assembly 30 upon the occurrence of a predetermined condition 230. This predetermined condition may comprise the detection assembly 30 exceeding a substantially vertical distance from an initial position. For example, and with reference to FIG. 10, the method 200 comprises using the deactivation mechanism 50 configured to automatically activate the indicator assembly 40 upon the detection assembly 30 traveling a substantially vertical distance of about 5 feet to about 15 feet from an initial position 232. As is shown in FIG. 9, and indicated as 240, the method 200 further comprises using the activation mechanism 50 to manually activate or deactivate the indicator assembly 40. As shown in the illustrative embodiment of FIG. 10, and indicated as 242, the method 200 according to the present invention further comprises using the activation mechanism 50 to manually activate the indicator assembly 40.

Since many modifications, variations and changes in detail can be made to the described invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A warning assembly structured to be used with load transporting equipment, said warning assembly comprising:
   a housing,
   an attachment assembly connected to said housing and structured to attach said housing to a load during all portions of its movement by one or more of the load transporting equipment and structured to be removed upon completion of a required movement of the load,
   a detection assembly disposed on said housing,
   an indicator assembly disposed on said housing,
   an activation mechanism operatively connected to said indicator assembly and to said detection assembly, and
   said activation mechanism configured to activate said indicator assembly upon the occurrence of a predetermined condition, and
   said activation mechanism further structured to delay said activation of said indicator assembly upon the occurrence of said predetermined condition by a defined amount.

2. The warning assembly as recited in claim 1 wherein said detection assembly is configured to determine at least a substantially vertical distance of travel from an initial position of said detection assembly.

3. The warning assembly as recited in claim 2 wherein said predetermined condition comprises said detection assembly traveling about 5 feet to about 15 feet in a substantially vertical direction.

4. The warning assembly as recited in claim 1 wherein said indicator assembly comprises a sound indicator; said activation mechanism configured to activate said sound indicator upon the occurrence of said predetermined condition.

5. The warning assembly as recited in claim 1 wherein said indicator assembly comprises a visual indicator; said activation mechanism configured to activate said visual indicator upon the occurrence of said predetermined condition.

6. The warning assembly as recited in claim 1 wherein said activation mechanism comprises at least one activation structure configured to manually control said indicator assembly.

7. The warning assembly as recited in claim 6 wherein said indicator assembly comprises a sound indicator; said at least one activation structure configured to manually control said sound indicator.

8. The warning assembly as recited in claim 6 wherein said indicator assembly comprises a visual indicator; said at least one activation structure configured to manually control said visual indicator.

9. The warning assembly as recited in claim 1 wherein said activation mechanism is at least partially disposed on said housing.

10. The warning assembly as recited in claim 1 further comprising an ancillary component; said activation mechanism at least partially disposed on said ancillary component.

11. The warning assembly as recited in claim 1 wherein said detection assembly comprises a lightning detector; said predetermined condition comprising said lightning detector determining the occurrence of a lightning event within sufficient proximity to said detection assembly to activate said indicator assembly.

12. The warning assembly as recited in claim 1 wherein said activation mechanism comprises a timer configured to delay activation of said indicator assembly by a predetermined period of time.

13. The warning assembly as recited in claim 1 wherein said detection assembly comprises an acceleration measuring device configured to determine an acceleration of said detection assembly; said predetermined condition comprising said acceleration of said detection assembly exceeding a predetermined acceleration to activate said indicator assembly.

14. The warning assembly as recited in claim 1 further comprising a portable device; said detection assembly comprising proximity capabilities cooperatively configured with said portable device; said predetermined condition comprising said portable device being located within sufficient proximity to said detection assembly to activate said indicator assembly.

15. The warning assembly as recited in claim 14 wherein said indicator assembly comprises a sound indicator disposed on said portable device; said activation mechanism configured to activate said sound indicator upon said portable device being located within sufficient proximity to said detection assembly.

16. The warning assembly as recited in claim 1 further comprising a portable component comprising radio frequency identification (RFID) capabilities; said portable component operatively configured with said detection assembly to record data associated with said detection assembly.

17. The warning assembly as recited in claim 1 further comprising a solar-powered rechargeable battery assembly disposed on said housing.

18. A method for using a warning assembly with one or more elements of load transporting equipment when transporting a load, the method comprising:
   (a) providing a warning assembly comprising:
      a housing,
      an attachment assembly connected to said housing and structured to removably attach said housing to a load during all portions of its movement by one or more of the load transporting equipment,
      a detection assembly disposed on the housing,
      an indicator assembly disposed on the housing, and
      an activation mechanism operatively connected to the indicator assembly and to the detection assembly; the activation mechanism configured to activate the indicator assembly;
   (b) removably securing said attachment assembly to the load;
   (c) using the activation mechanism to automatically activate the indicator assembly after a delay of a defined amount upon the detection assembly traveling a substantially vertical distance from an initial position; and
   (d) completing movement of the load by the one or more elements of load transporting equipment; and
   (e) removing the attachment assembly from the load after it has completed its required movement.

19. A warning assembly structured to be used with load transporting equipment, said warning assembly comprising:
   a housing,
   an attachment assembly connected to said housing and structured to attach said housing to a load during all portions of its movement by one or more of the load transporting equipment and structured to be removed upon completion of a required movement of the load,
   a detection assembly disposed on said housing,
   an indicator assembly disposed on said housing,
   an activation mechanism operatively connected to said indicator assembly and to said detection assembly,
   said activation mechanism configured to activate said indicator assembly upon the occurrence of a predetermined condition; and
   said activation mechanism further structured to delay said activation of said indicator assembly upon the occurrence of said predetermined condition by a defined amount.

* * * * *